(12) United States Patent
Xu et al.

(10) Patent No.: US 11,551,706 B2
(45) Date of Patent: Jan. 10, 2023

(54) CROSSTALK DATA DETECTION METHOD AND ELECTRONIC DEVICE

(71) Applicant: Alibaba Group Holding Limited, Grand Cayman (KY)

(72) Inventors: Yunfeng Xu, Hangzhou (CN); Tao Yu, Bellevue, WA (US)

(73) Assignee: Alibaba Group Holding Limited, George Town (KY)

( * ) Notice: Subject to any disclaimer, the term of this patent is extended or adjusted under 35 U.S.C. 154(b) by 81 days.

(21) Appl. No.: 17/111,341

(22) Filed: Dec. 3, 2020

(65) Prior Publication Data

US 2021/0090589 A1 Mar. 25, 2021

Related U.S. Application Data

(63) Continuation of application No. PCT/CN2019/094530, filed on Jul. 3, 2019.

(30) Foreign Application Priority Data

Jul. 12, 2018 (CN) .......................... 201810763010.9

(51) Int. Cl.
*G10L 25/06* (2013.01)
*G10L 19/008* (2013.01)
(Continued)

(52) U.S. Cl.
CPC ............ *G10L 25/06* (2013.01); *G10L 19/008* (2013.01); *G10L 19/0204* (2013.01); *G10L 25/15* (2013.01)

(58) Field of Classification Search
CPC ....................................................... G10L 25/06
See application file for complete search history.

(56) References Cited

U.S. PATENT DOCUMENTS 8,433,074 B2 4/2013 Hoshuyama
9,672,805 B2 6/2017 Kim et al.
(Continued)

FOREIGN PATENT DOCUMENTS

CN 107316651 A 11/2017
GB 2391322 A * 2/2004 ........... G10H 1/0008
(Continued)

OTHER PUBLICATIONS

N. J. Cox, C. J. Page, R. F. Petrescu and S. M. Aziz, "Algorithms for Alignment of Co-Channel Speech Signals in Adaptive Speech Separation," 2007 International Conference on Information and Communication Technology, 2007, pp. 307-310, doi: 10.1109/ICICT.2007.375399. (Year: 2007).*

(Continued)

*Primary Examiner* — Richemond Dorvil
*Assistant Examiner* — Alexander G Marlow
(74) *Attorney, Agent, or Firm* — Lee & Hayes, P.C.

(57) ABSTRACT

A method and an electronic device for detecting crosstalk data are provided. The method for detecting crosstalk data can detect whether an audio data stream includes crosstalk data. The method includes: receiving a first audio data block, a second audio data block, and a reference time difference, wherein the first audio data block and the second audio data block separately include a plurality of audio data segments; using a time difference between an acquisition time of an audio data segment in the first audio data block and a corresponding audio data segment in the second audio data block as an audio segment time difference; and determining that the audio data segment of the first audio data block includes crosstalk data when the audio segment time difference does not match the reference time difference.

20 Claims, 6 Drawing Sheets

(51) Int. Cl.
*G10L 19/02* (2013.01)
*G10L 25/15* (2013.01)

(56) References Cited

U.S. PATENT DOCUMENTS

| | | | |
|---|---|---|---|
| 9,706,296 B2 | 7/2017 | Uhle et al. |
| 10,127,006 B2 | 11/2018 | Sheen |
| 10,142,484 B2 | 11/2018 | Spittle et al. |
| 10,425,903 B2 | 9/2019 | Abdelmonem et al. |
| 10,482,890 B2 | 11/2019 | Srinivasan et al. |
| 10,776,894 B2 | 9/2020 | Stach et al. |
| 2013/0156238 A1 | 6/2013 | Birch et al. |
| 2021/0090589 A1 | 3/2021 | Xu et al. |

FOREIGN PATENT DOCUMENTS

| | | | | |
|---|---|---|---|---|
| JP | 2003131685 A | * | 5/2003 | ............. G10L 19/02 |
| JP | 2006039108 A | | 2/2006 | |
| SE | 519981 C2 | * | 5/2003 | ............. G10L 19/08 |
| TW | 201732785 A | | 9/2017 | |
| WO | WO-2008103087 A1 | * | 8/2008 | ......... G10L 21/0208 |
| WO | WO-2010092913 A1 | * | 8/2010 | ......... G10L 21/0272 |
| WO | WO2017064840 A1 | | 4/2017 | |

OTHER PUBLICATIONS

Thilo Pfau , Daniel P. W. Ellis , Andreas Stolcke "Multispeaker speech activity detection for the ICSI Meeting Recorder" in Proceedings IEEE Automatic Speech Recognition and Understanding Workshop, Madonna di Campiglio (Year: 2001).*

B. Xiao, P. K. Ghosh, P. Georgiou and S. S. Narayanan, "Overlapped speech detection using long-term spectro-temporal similarity in stereo recording," 2011 IEEE International Conference on Acoustics, Speech and Signal Processing (ICASSP), 2011, pp. 5216-5219, doi: 10.1109/1CASSP.2011.5947533. (Year: 2011).*

Wrigley, Stuart N., Guy J. Brown, Vincent Wan and Steve Renals. "Speech and crosstalk detection in multichannel audio." IEEE Transactions on Speech and Audio Processing 13 (2005): 84-91. (Year: 2005).*

English translation of International Search Report dated Sep. 26, 2019, from corresponding PCT Application No. PCT/CN2019/094530, 2 pages.

English translation of Written Opinion dated Sep. 26, 2019, from corresponding PCT Application No. PCT/CN2019/094530, 3 pages.

* cited by examiner

CROSSTALK DATA DETECTION METHOD AND ELECTRONIC DEVICE

CROSS REFERENCE TO RELATED PATENT APPLICATIONS

This application claims priority to and is a continuation of PCT Patent Application No. PCT/CN2019/094530 filed on 3 Jul. 2019, and is related to and claims priority to Chinese Application No. 201810763010.9, filed on 12 Jul. 2018 and entitled "Crosstalk Data Detection Method and Electronic Device," which are hereby incorporated by reference in their entirety.

TECHNICAL FIELD

The present disclosure relates to the technical field of computers, and particularly to crosstalk data detection methods and electronic devices.

BACKGROUND

In real life, people get together to communicate and discuss matters. In some scenarios, a microphone can be used to amplify a sound source, and multiple microphones on a site can collect audio data for each character. In some cases, crosstalk may occur when two or more microphones are very close to each other.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Implementations of the present disclosure provide a crosstalk data detection method and electronic device that can detect crosstalk data.

The implementations of the present disclosure provides a method for detecting crosstalk data, which includes: receiving a first audio data block and a second audio data block, wherein the first audio data block and the second audio data block each include a plurality of audio data segments; calculating correlation coefficients between audio data segments of the first audio data block and audio data segments of the second audio data block to obtain a peak value of the correlation coefficients; using a time difference between an acquisition time of an audio data segment in the first audio data block and an acquisition time of an audio data segment in the second audio data block corresponding to the peak value as a reference time difference; using time difference(s) between acquisition time(s) of audio data segment(s) of the first audio data block and acquisition time(s) of corresponding audio data segment(s) of the second audio data block as audio segment time difference(s); and determining that a corresponding audio data segment of the first audio data block includes crosstalk data when an associated audio segment time difference does not match the reference time difference.

The implementations of the present disclosure provide an electronic device, which includes: a first sound sensing device configured to generate a first audio data block, the first audio data block including a plurality of audio data segments; a second sound sensing device configured to generate a second audio data block, the second audio data block includes a plurality of audio data segments; a processor configured to calculate correlation coefficients between the plurality of audio data segments of the first audio data block and the plurality of audio data segments of the second audio data block to obtain a peak value of the correlation coefficients, use a time difference between an acquisition time of an audio data segment in the first audio data block and an acquisition time of an audio data segment in the second audio data block corresponding to the peak value as a reference time difference, use time difference(s) between acquisition time(s) of audio data segment(s) of the first audio data block and acquisition time(s) of corresponding audio data segment(s) of the second audio data block as audio segment time difference(s), and determine that a corresponding audio data segment of the first audio data block includes crosstalk data when an associated audio segment time difference does not match the reference time difference.

The implementations of the present disclosure provide a method for detecting crosstalk data, which includes: receiving a first audio data block and a second audio data block, wherein the first audio data block and the second audio data block each include a plurality of audio data segments; calculating correlation coefficients between audio data segments of the first audio data block and audio data segments of the second audio data block to obtain a peak value of the correlation coefficients; using a time difference between an acquisition time of an audio data segment in the first audio data block and an acquisition time of an audio data segment in the second audio data block corresponding to the peak value as a reference time difference; sending the reference time difference, the first audio data block, and the second audio data block to a server, to allow the server to use time difference(s) between acquisition time(s) of audio data segment(s) of the first audio data block and acquisition time(s) of corresponding audio data segment(s) of the second audio data block as audio segment time difference(s), and to determine that a corresponding audio data segment of the first audio data block includes crosstalk data when an associated audio segment time difference does not match the reference time difference.

The implementations of the present disclosure provide a method for detecting crosstalk data, which includes: receiving a first audio data block, a second audio data block, and a reference time difference, wherein the first audio data block and the second audio data block separately include a plurality of audio data segments; using a time difference between an acquisition time of an audio data segment in the first audio data block and a corresponding audio data segment in the second audio data block as an audio segment time difference; and determining that the audio data segment of the first audio data block includes crosstalk data when the audio segment time difference does not match the reference time difference.

The implementations of the present disclosure provide a method for detecting crosstalk data, which includes: receiving a first audio data block and a second audio data block, wherein the first audio data block and the second audio data block separately include a plurality of audio data segments; calculating correlation coefficients between audio data segments of the first audio data block and audio data segments of the second audio data block to obtain a peak value of the correlation coefficients; sending the peak value, the first audio data block, and the second audio data block to a server, to allow the server to set a time difference between an acquisition time of an audio data segment in the first audio data block and an audio data segment in the second audio data block corresponding to the peak value as a reference time difference, to set time difference(s) between acquisition time(s) of audio data segment(s) in the first audio data block and acquisition time(s) of corresponding audio data segment(s) in the second audio data block as audio segment time difference(s), and to determine that a corresponding audio data segment of the first audio data block includes crosstalk data when an associated audio segment time difference does not match the reference time difference.

The implementations of the present disclosure provide a method for detecting crosstalk data, which includes: receiving a peak value of correlation coefficients, a first audio data block, and a second audio data block provided by a client, wherein the peak value is a peak value of correlation coefficients between audio data segments of the first audio data block and audio data segments of the second audio data block; setting a time difference between an acquisition time of an audio data segment in the first audio data block and an acquisition time of an audio data segment in the second audio data block corresponding to the peak value as a reference time difference; setting time difference(s) between acquisition time(s) of audio data segment(s) in the first audio data block and acquisition time(s) of corresponding audio data segment(s) in the second audio data block as audio segment time difference(s); and determining that a corresponding audio data segment of the first audio data block includes crosstalk data when an associated audio segment time difference does not match the reference time difference.

The implementations of the present disclosure provide a method for detecting crosstalk data, including: receiving a first audio data block and a second audio data block, wherein the first audio data block and the second audio data block each include a plurality of audio data segments; sending the first audio data block and the second audio data block to a server, to allow the server to calculate correlation coefficients between audio data segments of the first audio data block and audio data segments of the second audio data block to obtain a peak value of the correlation coefficients; setting a time difference between an acquisition time of an audio data segment in the first audio data block and an acquisition time of an audio data segment in the second audio data block corresponding to the peak value as a reference time difference; setting time difference(s) between acquisition time(s) of audio data segment(s) in the first audio data block and corresponding audio data segment(s) in the second audio data block as acquisition time(s) of audio segment time difference(s); determining that a corresponding audio data segment of the first audio data block includes crosstalk data when an associated audio segment time difference does not match the reference time difference.

As can be seen from the technical solutions provided by the above implementations of the present disclosure, by determining a reference time difference between a first audio data block and a second audio data block, detecting crosstalk data based on the reference time difference is achieved. Since delay information of a sound is related to spatial positions of a sound source and a microphone, whether an audio data block includes crosstalk data can be effectively detected based on a time difference of a delay.

BRIEF DESCRIPTION OF THE DRAWINGS

In order to more clearly describe the technical solutions in the implementations of the present disclosure or the existing technologies, drawings that need to be used in description of the implementations or existing technologies are briefly described herein. Apparently, the described drawings represent only some implementations recorded in the present disclosure. For one of ordinary skill in the art, other drawings can be obtained based on these drawings without making any creative effort.

DETAILED DESCRIPTION

In order to enable one skilled in the art to better understand the technical solutions in the present disclosure, the technical solutions in the implementations of the present disclosure are clearly and completely described hereinafter with reference to the drawings in the implementations of the present disclosure. Apparently, the described implementations represent only some and not all of the implementations of the present disclosure. Based on the implementations in the present disclosure, all other implementations obtained by one of ordinary skill in the art without making any creative effort should fall within the scope of protection of the present disclosure.

Figure 1:
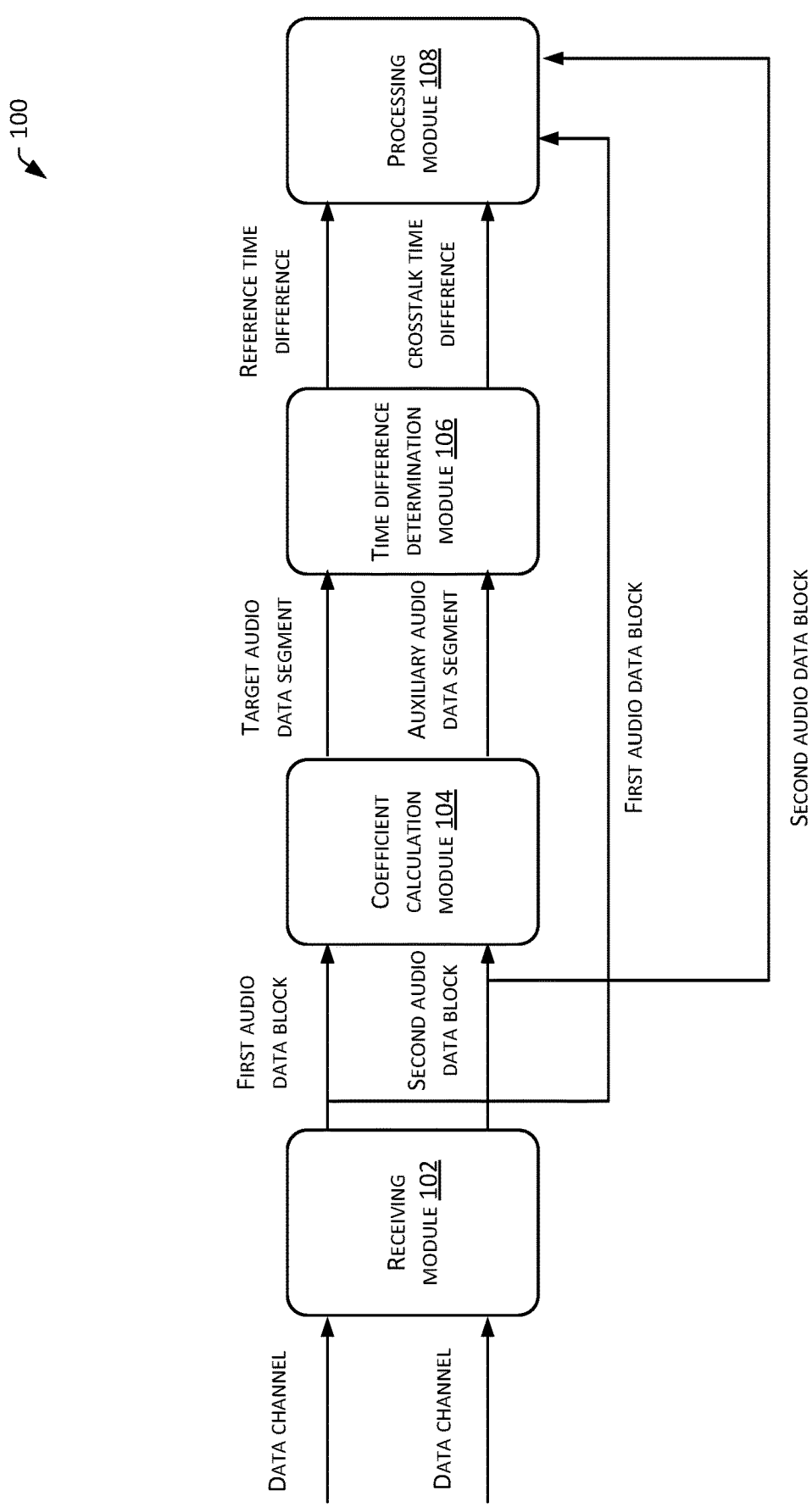
FIG. 1 is a schematic diagram of a crosstalk data detection system provided by the implementations of the present disclosure.
Figure 2:
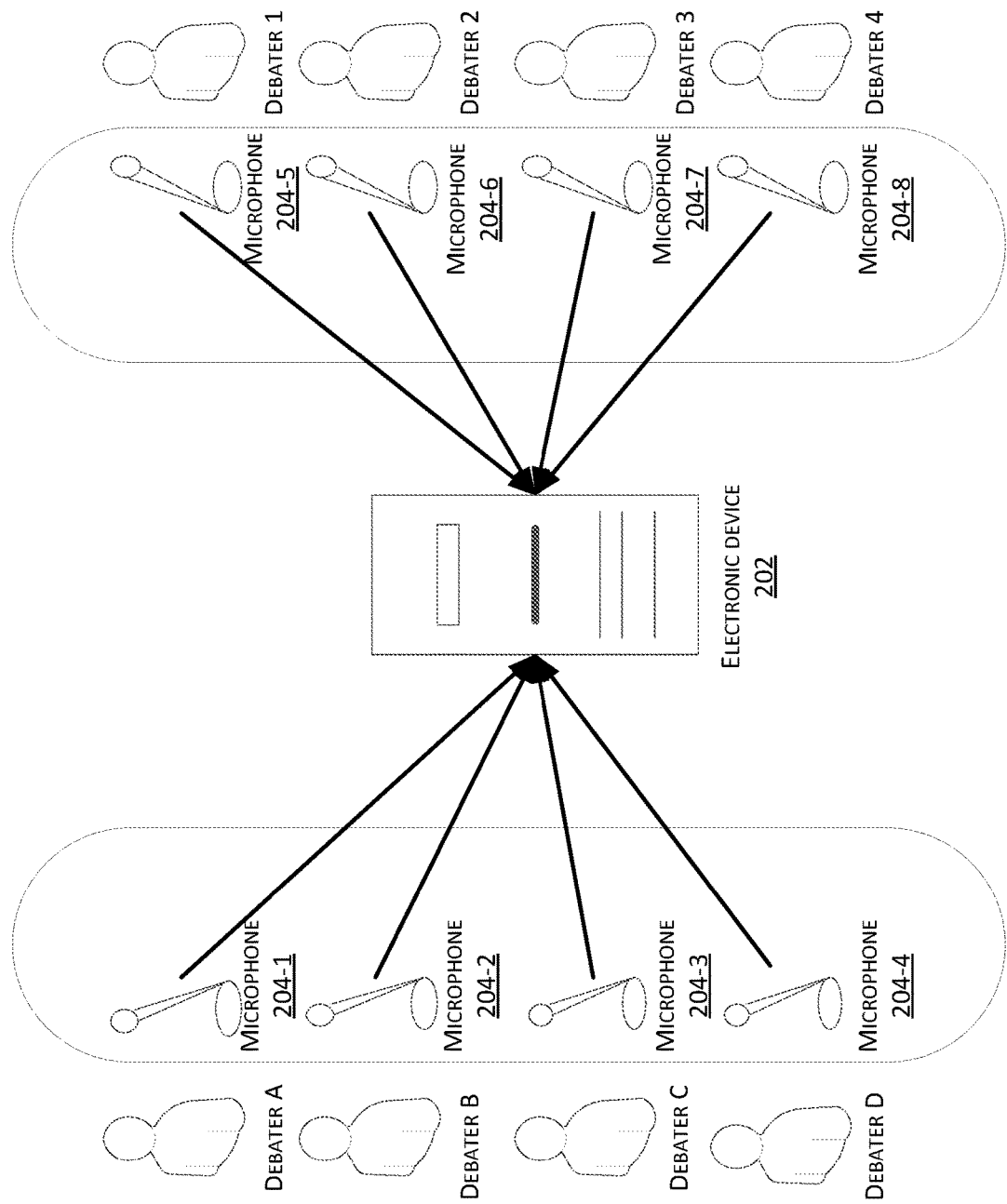
FIG. 2 is a schematic application scenario diagram of a crosstalk data detection system under a debate competition scenario provided by the implementations of the present disclosure.

Referring to FIG. 1 and FIG. 2, in an example scenario, four debaters of positive and negative sides respectively sit by long tables on two ends at a debate scene. Two microphones are placed on each long table, and are used for sensing a sound produced by a debater, and the sound sensed by the microphones (microphones 204-1, 204-2, ..., 204-8) is amplified by a power amplifier.

In this example scenario, a first speaker speaks in front of a microphone 204-1, and says: "I think globalization is beneficial to developing countries . . . ." Since a distance between the microphone 204-1 and a microphone 204-2 is relatively short, the microphone 204-2 may also sense the voice of "I think globalization is beneficial to developing countries . . . ." At the same time, a debater B spoke in front of the microphone 204-2, saying: "Globalization is beneficial to trade development . . . ." The microphone 204-1 may also sense the voice of ""Globalization is beneficial to trade development . . . ." Therefore, the microphone 204-1 and the microphone 204-2 may generate respective audio data streams according to the sounds that are sensed.

In this example scenario, an electronic device 202 may be set up, and the electronic device 102 may receive the audio data streams generated by the microphone 204-1 and the microphone 204-2 through a receiving module, and process the audio data streams to detect crosstalk data in the audio data streams.

In this example scenario, when the debater A says to microphone 204-1: "I think globalization is beneficial to developing countries . . . ", and the debater B said to the microphone 204-2: "Globalization is beneficial to trade development . . . ", the electronic device 102 receives the sound sensed by the microphone 204-1 and generates an audio data stream. At the same time, since the microphone 204-2 may also generate an audio data stream based on the sound sensed thereby. A receiving module may have multiple data channels corresponding to the number of microphones. The microphone 204-1 corresponds to a data channel A, and the microphone 204-2 corresponds to a data channel B. In this example scenario, there may be a total of 8 microphones, and the electronic device 202 may have 8 data channels. Furthermore, the electronic device 202 may receive an audio data stream input by a microphone through a data channel by means of WIFI.

In this example scenario, the receiving module may divide an audio data stream into audio data blocks. Specifically, an audio data stream in the data channel A may be divided to obtain first audio data blocks, and an audio data stream in the data channel B may be divided to obtain second audio data blocks.

In this example scenario, the electronic device 202 may use the audio data stream input by the data channel A as a target, and detect whether the audio data stream in the data channel A has crosstalk data based on an association between audio data streams in the data channel A and the data channel B.

In this example scenario, each audio data block of the first audio data block and the second audio data block may be divided into a number of audio data segments in a unit of 1000 ms.

In this example scenario, a coefficient calculation module of the electronic device 202 may separately perform a Fourier transform on the first audio data blocks and the second audio data blocks. According to Fourier transforms of the first audio data blocks and the second audio data blocks, a cross-correlation function is generated. Correlations between audio data segments in the first audio data blocks and audio data segments in the second audio data blocks can be calculated according to the cross-correlation function. Specifically, correlations can be separately calculated between the audio data segments in the first audio data blocks and the audio data segments in the second audio data blocks, and a maximum value of the calculated correlations can be regarded as an audio data segment in a second audio data block corresponding to the maximum value being correlated with an audio data segment in a first audio data block. In this way, the maximum value can be considered as a final correlation coefficient of the audio data segment in the first audio data block.

In this example scenario, a correlation coefficient corresponding to an audio data segment in an audio data block can be calculated according to the cross-correlation function. Since there are two people talking at the same time, correlation coefficients corresponding to the audio data segments in the audio data blocks may have two peaks, which are 0.3 and 0.5 respectively. It is possible to determine 0.3 as a first correlation coefficient and 0.5 as a second correlation coefficient.

In this example scenario, a threshold may be set, and audio data segments can be filtered according to the threshold to obtain valid data in an audio data block. For example, the threshold may be 0.1. When a correlation coefficient is greater than 0.1, an audio data segment in the first audio data block corresponding to the correlation coefficient may be considered to have a relatively high degree of similarity with an audio data segment in the second audio data block. These two audio data segments may be considered to be originated from a same sound source, i.e., being considered as valid data. When the correlation coefficient is less than 0.1, it is considered that a degree of similarity between respective audio data segments in the first audio data block and the second audio data block corresponding to the correlation coefficient is low, and it can be considered that the respective audio data segment in the first audio data block corresponding to the correlation coefficient may be noise. In this example scenario, crosstalk detection may not be performed on audio data segments that are considered to be noise. Since the first correlation coefficient and the second correlation coefficient are 0.3 and 0.4, which are both greater than 0.1, audio data segments corresponding to the first correlation coefficient and the second correlation coefficient can be considered to be valid data.

In this example scenario, the coefficient calculation module may determine an audio data segment in the first audio data block corresponding to the first correlation coefficient as a first target audio data segment, determine an audio data segment in the first audio data block corresponding to the second correlation as a second target audio data segment, determine an audio data segment in the second audio data block corresponding to the first correlation coefficient as a first auxiliary audio data segment, and determine an audio data segment in the second audio data block corresponding to the second correlation coefficient as a second auxiliary audio data segment.

In this example scenario, a time difference determination module of the electronic device 202 may calculate a first time difference between the first target audio data segment and the first auxiliary audio data segment. For example, the first time difference may be 30 ms. A second time difference between the second target audio data segment and the second auxiliary audio data segment is calculated. For example, the second time difference may be 60 ms.

In this example scenario, the time difference determination module may determine the smaller one of the first time difference and the second time difference as a reference time difference, and the other as a crosstalk time difference. In other words, the reference time difference can be determined as 30 ms, and the crosstalk time difference can be determined as 60 ms.

In this example scenario, a processing module of the electronic device 202 determines a respective audio data segment in the second audio data block corresponding to each audio data segment in the first audio data block according to the correlation coefficients, and further calculates audio segment time differences between audio data segments in the first audio data block and corresponding audio data segments in the second audio data block. When an audio segment time difference corresponding to an audio data segment in the first audio data block is equal to 30 ms, a determination is made that the audio data segment in the first audio data block is main audio data. When an audio segment time difference is equal to 60 ms, a determination is made that an associated audio data segment in the first audio data block is crosstalk data.

In an example scenario, the debater B makes a statement, and the debater B speaks to the microphone 204-2 in front of him/her, saying: "I think globalization is beneficial to developing countries . . . ." Since the microphone 204-1 is relatively close to the microphone 204-2, the microphone 204-1 can also sense the voice of "I think globalization is beneficial to developing countries . . . ." Therefore, both the microphone 204-1 and the microphone 204-2 can generate corresponding audio data streams according to the sensed voices. The electronic device may generate the first audio data block and the second audio data block according to the audio data streams input by the data channel A and the data channel B.

In this example scenario, the electronic device 202 may calculate correlation coefficients between audio data segments in the first audio data block and audio data segments in the second audio data block. The audio data segments in the first audio data block are filtered and selected based on the correlation coefficients, and 150 audio data segments that are valid data are obtained from the first audio data block. Furthermore, the electronic device obtains a peak value of 0.4 from the correlation coefficients between the first audio data block and the second audio data block, and a time difference corresponding to the peak value 0.4 of the correlation coefficients is 50 ms.

In this example scenario, the electronic device 202 calculates a smoothing energy of each audio data segment in the first audio data block and the second audio data block, and counts the number of audio data segments in the first audio data block that have smoothing energies larger than smoothing energies of audio data segments in the second audio data block. The number of counts is 5. The electronic device may set that a time difference corresponding to a peak of correlation coefficients is determined to be a reference time difference if a ratio between the number of audio data segments in the first audio data block that have smoothing energies larger than smoothing energies of audio data segments in the second audio data block and the number of pieces of valid data is greater than 0.8, and the time difference corresponding to the peak of the correlation coefficients is determined to be a crosstalk time difference if being less than 0.2. Since the ratio of 5 with respect to 150 is less than 0.2, the time difference of 50 ms determined to be a crosstalk time difference.

In this example scenario, the electronic device 202 calculates a time difference corresponding to an audio data segment of the first audio data block, and determines that corresponding voice data is crosstalk data when the calculated time difference is equal to 50 ms.

In this example scenario, other data channels may be used as targets for detecting crosstalk data in audio data streams transmitted by the other data channels.

In this example scenario, in the entire debate process, the detected crosstalk data can be further removed, and an audio data block obtained after the crosstalk is removed is stored in a designated audio file to generate a clearer debate record.

Referring to FIG. 1, the implementations of the present disclosure provide a crosstalk data detection system 100. The crosstalk data detection system may include a receiving module 102, a coefficient calculation module 104, a time difference determination module 106, and a processing module 108. The following description of the present disclosure introduces the crosstalk data detection system using functional modules, and a crosstalk data detection method is implemented when the crosstalk data detection system 100 is run. The crosstalk data detection method can be understood with reference to the following functional modules, and will not be repeated.

The receiving module 102 may receive a first audio data block and a second audio data block; wherein the first audio data block and the second audio data block respectively include a plurality of audio data segments.

In implementations, the receiving module 102 may receive a first audio data block inputted through a first data channel and a second audio data block inputted through a second data channel. Specifically, the receiving module may be a receiving device, or a communication module with data interaction capabilities. The receiving module may receive the first audio data block inputted through the first data channel and the second audio data block inputted through the second data channel in a wired manner. It is also possible to receive the first audio data block and the first audio data block inputted through the first data channel and the second audio data block inputted through the second data channel based on a network protocol such as HTTP, TCP/IP, or FTP or through a wireless communication module such as a WIFI module, a ZigBee module, a Bluetooth module, a Z-wave module, etc. Apparently, the receiving module can also be referred to as a software program interface, which can run in a processing unit having computing capabilities.

In implementations, the receiving module 102 may have multiple data channels corresponding to the number of sound sensing devices. A sound sensing device may include a device capable of sensing sound to generate an audio data stream and inputting the audio data stream into a data channel. Examples are a microphone, a voice recorder, etc. In implementations, the data channel may include a carrier for audio data block transmission. The data channel may be a physical channel or a logical channel. According to transmission paths of audio data blocks, the data channels may be different. Specifically, for example, if two microphones are provided, a sound source can generate sound that is sensed by these two microphones to generate audio data streams, and the channel through which each microphone transmits the audio data stream can be called a data channel. Apparently, the data channels can also be logically divided, which can be understood as separately processing the audio data streams inputted through different microphones, i.e., individually processing an audio data stream inputted through a microphone, instead of mixing audio data streams inputted through multiple microphones.

In implementations, the first audio data block may be generated according to the audio data stream in the first data channel. The second audio data block may be generated according to the audio data stream in the second data channel. The sound sensing device can generate a corresponding audio data stream according to a sensed sound. The first audio data block and the second audio data block may correspond to different sound sensing devices. Since spatial locations of the sound sensing devices may be different, the times when the audio data streams generated by different sound sensing devices that sense the sound from the sound source may also be different.

In implementations, the first audio data block and the second audio data block may respectively include multiple audio data blocks. The receiving module may divide the audio data stream of the first data channel and the audio data stream of the second data channel into data blocks according to certain rules, and the divided data blocks may be the audio data blocks. The audio data stream can be divided into audio data blocks according to a length of time or a number. Specifically, for example, the audio data stream may be divided into an audio data block in a unit of 10 ms. Apparently, the audio data block may not be limited to 10 ms. Alternatively, the audio data block may be divided according to an amount of data. For example, each audio data block may have up to 1 MB. Alternatively, a division is performed according to a continuous condition of a sound waveform represented by the audio data stream. For example, for endpoint detection, a silent part having a certain time difference between two adjacent continuous waveforms exists, and each continuous sound waveform is demarcated as an audio data block. The audio data block may include multiple audio data segments. The audio data segments can be used as basic units for processing.

The coefficient calculation module 104 is configured to calculate correlation coefficients between audio data segments of the first audio data block and audio data segments of the second audio data block to obtain a peak value of the correlation coefficients.

In implementations, a correlation coefficient can be used to indicate a degree of closeness of a relationship between audio data blocks. Alternatively, the correlation coefficient can be used to indicate a degree of similarity between audio data blocks. A larger value of a correlation coefficient may indicate that audio data segments included in the two audio data blocks are more similar. On the contrary, a smaller value of the correlation coefficient may indicate that the audio data segments included in the two audio data blocks are different.

In implementations, Fourier transform may separately be performed on the audio data segments in the audio data blocks according to the GCC PHAT method (phase transform weighted generalized cross-correlation). After Fourier transform, a cross-correlation function may be generated based on the audio data segments in the first audio data block and the audio data segments in the second audio data block to obtain the correlation coefficients. Apparently, the correlation coefficient can also be calculated according to a basic cross-correlation method, a cross-power spectrum phase method and other methods. Apparently, one skilled in the art can adopt other modified solutions under the enlightenment of the technical essence of the present disclosure for obtaining correlation coefficients, which shall be covered within the scope of protection of the present application as long as the functions and effects implemented thereby are the same or similar to the present disclosure.

Figure 3:
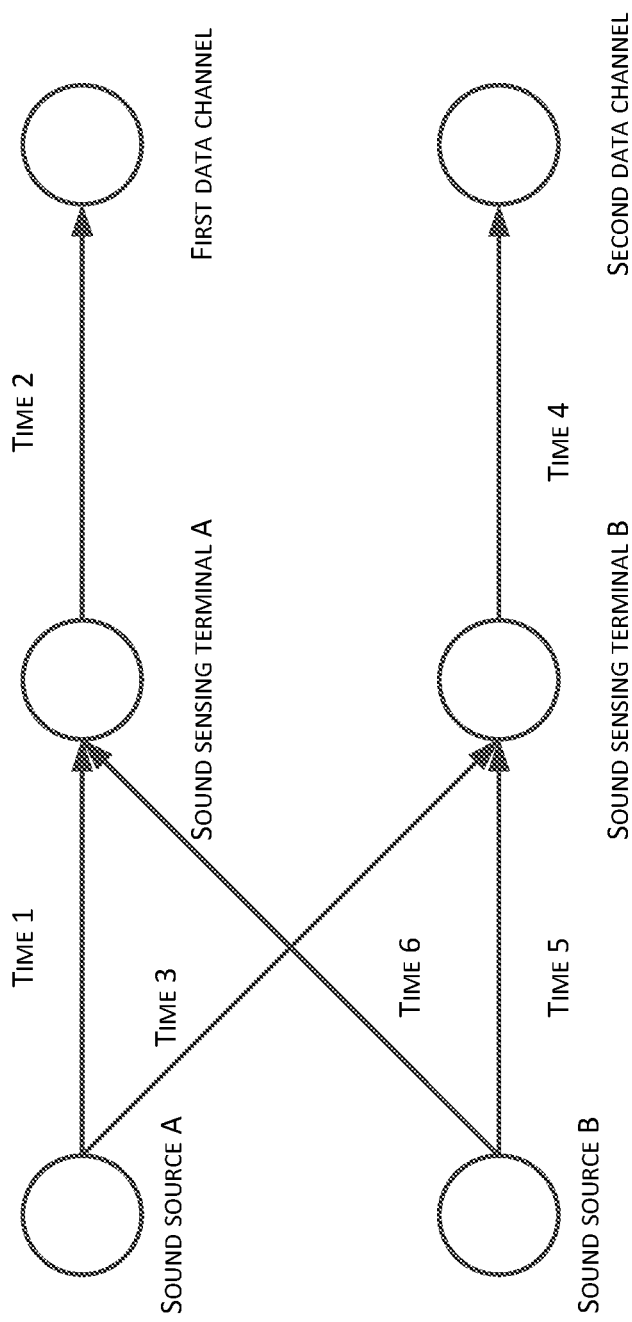
FIG. 3 is a schematic diagram of a transmission path of an audio data block provided by the implementations of the present disclosure.

In implementations, referring to FIG. 3, in a certain space, there may be two sound sources emitting sound. A first sound sensing device and a second sound sensing device may separately generate audio data streams and input thereof to corresponding first data channel and second data channel. A time length taken from emitting a sound by a sound source A to sensing the sound by the first sound sensing device is time 1. A time length taken from sensing the sound emitted from the sound source A by the first sound sensing device to inputting an audio data stream to the first data channel is time 2. A time length taken from emitting the sound by the sound source A to sensing the sound by the second sound sensing device is time 3. A time length taken from sensing the sound emitted from the sound source A by the second sound sensing device to inputting an audio data stream to the second data channel is time 4. The audio data streams, which are formed by the sound emitted by the sound source A, in the first data channel and the second data channel can be divided into audio data blocks including audio data segments, and correlation coefficients can then be calculated using a method such as GCC PHAT. A time length taken from emitting a sound by a sound source B to sensing the sound by the first sound sensing device is time 5. A time length taken from sensing the sound emitted from the sound source B by the first sound sensing device to inputting an audio data stream to the first data channel is time 6. A time length taken from emitting the sound by the sound source B to sensing the sound by the second sound sensing device is time 7. A time length taken from sensing the sound emitted from the sound source B by the second sound sensing device to inputting an audio data stream to the second data channel is time 8. The audio data streams, which are formed by the sound emitted by the sound source B, in the first data channel and the second data channel can be divided into audio data blocks including audio data segments, and correlation coefficients can then be calculated using a method such as GCC PHAT. Therefore, two sound sources emit sounds in the space, and two correlation coefficients can be calculated and obtained.

In implementations, each sound sensing device may correspond to one user, and each sound sensing device can thereby be used to distinguish different users. Furthermore, an audio data stream inputted by each sound sensing device is processed, so that an audio file corresponding to each user can be finally obtained. Therefore, each audio file can more accurately characterize a voice of a user.

The time difference determination module 106 may be configured to set a time difference between an acquisition time of an audio data segment in the first audio data block and an acquisition time of an audio data segment in the second audio data block corresponding to the peak value as a reference time difference.

In implementations, the audio data segment in the first audio data block and the audio data segment in the second audio data block that correspond to the peak value may be considered to be the most similar, or to include audio data originating mostly from a same sound source. In this way, a time difference between audio data segments corresponding to the peak value of the correlation coefficients can be used to characterize a time difference between audio data of the first audio data block and the second audio data block that is originated from the same sound source. The time difference can be used as a reference for determining whether a piece of audio data in the first audio data block is crosstalk data. In this way, the time difference can be used as the reference time difference.

In implementations, an acquisition time of an audio data segment may be a generation time of audio data of the audio data segment in the audio sensing device, or a receiving time of the audio data of the audio data segment received by the receiving module. Specifically, for example, the first audio sensing terminal and the second audio sensing terminal are very close to each other. When a user speaks, the times taken for the sound from the user's speech to reach the first audio sensing terminal and the second audio sensing terminal are very close. Therefore, the first audio sensing terminal and the second audio sensing terminal separately sense the sound of the user, and generate audio data. It can be assumed that the first audio sensing terminal senses the sound and generates a first audio data block, and the second audio sensing terminal senses the sound and generates a second audio data block. In this way, generation times of the first audio data block and the second audio data block are relatively close. However, since distances from the user to the first audio sensing terminal and the second audio sensing terminal are different, generation times of the first audio data block and the second audio data block are close.

The processing module 108 is configured to take time differences between acquisition times of audio data segments of the first audio data block and corresponding audio data segments in the second audio data block as audio segment time differences, and determine that a corresponding audio data segment of the first audio data block includes crosstalk data when a mismatch between an associated audio segment time difference and the reference time difference exists.

In implementations, the audio data segments in the first audio data block and the audio data segments in the second audio data block can be determined whether to be corresponding to each other based on whether to be originated from a same sound source. Alternatively, based on the above-mentioned correlation coefficients, it that an audio data segment in the first audio data block corresponding to a correlation coefficient can be considered to be corresponding to an audio data segment in the second audio data block.

In implementations, an audio segment time differences between an audio data segment in the first audio data block and a corresponding audio data segment in the second audio data block can be calculated. The audio segment time difference can be based on the time taken from detecting a sound sensor by a sound wave to generating a corresponding audio data segment as a reference, or can be based on inputting the audio data segment to a data channel by a sound sensor device, or can also be based on the time of receiving the audio data segment the receiving module. Specifically, a method of calculating the time difference may be the same as the method of calculating the reference time difference.

In implementations, the mismatch may include the audio segment time difference being not equal to the reference time difference. Alternatively, a second specified threshold value is set, and when an absolute value of a difference between the audio segment time difference and the reference time difference is greater than the second specified threshold, a determination can be made that the audio segment time difference does not match the reference time difference. Specifically, for example, a second specified threshold of 0.002 is set, the audio segment time difference is 0.03, and the reference time difference is 0.035. An absolute value of a difference between these two is 0.005. Therefore, it can be considered that the audio data segment includes crosstalk data.

In implementations, different sound sources correspond to different sound sensing devices, and may correspond to different time differences. Referring to FIG. 3, a distance between the sound source A and the first sound sensing device is spatially shorter than a distance between the sound source A and the second sound sensing device. As a result, time 1 is less than time 6. In this way, an audio segment time difference between audio data segments originated from the sound source A in the first data channel and the second data channel exists, for example, a difference between time 6 and time 1. The audio segment time difference corresponds to the sound source A, and when spatial positions of the sound source A, the first sound sensing device and the second sound sensing device remain unchanged, the value of the audio segment time difference is also unchanged. The same applies to the sound source B. In an audio data segment of the first data channel, some parts may be originated from the sound source A, and some parts may be originated from the sound source B. Similarly, in an audio data segment of the second data channel, some parts may be originated from the sound source A and some parts may be originated from the sound source B. By calculating an audio segment time difference between an audio data segment in the first data channel and an audio data segment in the second data channel corresponding to a correlation coefficient, the audio segment time difference can be used to distinguish between an audio data segment originated from the sound source A and an audio data segment originated from the sound source B in the first data channel. Crosstalk data can be understood as an audio data segment from the sound source B in the first data channel. In other words, crosstalk data may be an audio data segment originated from a sound source other than a target sound source.

In implementations, when an audio segment time difference matches the reference time difference, a corresponding audio data segment in the first audio data block can be considered to be originated from a sound source corresponding to a data channel where the first audio data block is located. As such, the audio data segment needs to be reserved for further processing and use. When the audio segment time difference does not match the reference time difference, the corresponding audio data segment in the first audio data block can be considered to be not originated from the sound source corresponding to the data channel where the first audio data block is located. The audio data segment needs to be removed from the first audio data block.

In an implementation, calculating the correlation coefficients between the audio data segments of the first audio data block and the audio data segments of the second audio data block to obtain the peak value of the correlation coefficients may include: calculating the correlation coefficients of the audio data segments in the first audio data block and the audio data segments in the second audio data block to form a correlation coefficient set; and setting a maximum value in the correlation coefficient set as the peak value.

In implementations, the correlation coefficients between the audio data segments of the first audio data block and the audio data segments of the second audio data block can be calculated to form a correlation coefficient set. Peak value(s) of the correlation coefficients is/are selected from the correlation coefficient set. Specifically, correlations between the audio data segments in the first audio data block and the audio data segments in the second audio data block can be calculated according to the cross-correlation function. Specifically, correlations between the audio data segments in the first audio data block and the audio data segments in the second audio data block can be separately calculated. A maximum value of the calculated correlations can be regarded as an audio data segment in the second audio data block corresponding to the maximum value to be corresponding to the audio data segment in the first audio data block. In this way, the maximum value can be regarded as a correlation coefficient finally corresponding to the audio data segment in the first audio data block. In this way, a correlation coefficient corresponding to each audio data segment in the first audio data block can be obtained, and a correspondence between an audio data segment in the first audio data block and an audio data segment in the second audio data block can be formed through the correlation coefficients.

In implementations, the peak value(s) may be a maximum value in the correlation coefficient set. Alternatively, the correlation coefficients are arranged according to an arrangement of corresponding audio data segments, so that the correlation coefficients form a continuous distribution, and peak(s) and trough(s) may be displayed as a whole, etc. The peak value(s) may be correlation coefficient(s) represented by the peak(s).

In an implementation, the coefficient calculation module may calculate the peak value(s) of the correlation coefficients, and the number of the peak value(s) may be more than two.

Correspondingly, setting the time difference between the acquisition time of the audio data segment in the first audio data block and the acquisition time of the audio data segment in the second audio data block corresponding to the peak value as the reference time difference by the time difference determination module 106 includes: separately calculating time differences between acquisition times of audio data segments in the first audio data block and acquisition times of audio data segments in the second audio data block corresponding to the two peaks, which are respectively a first time difference and a second time difference, wherein a smaller one of the first time difference and the second time difference is set as the reference time difference.

In implementations, two or more peaks of the correlation coefficients may be more than two peaks of the correlation coefficients of first audio data block and the second audio data block obtained based on the cross-correlation function. Alternatively, a specified interval may be set in the correlation coefficient set, and two maximum values in the specified interval are used as the peak values. Alternatively, one value in the correlation coefficient set can be set as a peak value, and a correlation coefficient that tends to be equal to the peak value after a certain data interval is another peak value. Alternatively, two second largest ones in the correlation coefficient are set as the peak values.

In implementations, more than two peaks in a correlation coefficients exist, which may indicate that audio data in an audio data block may originate from more than two sound sources. Specifically, for example, two peak values of the correlation coefficients are selected from the correlation coefficient set, which are respectively a first correlation coefficient and a second correlation coefficient. Audio data segments in the first audio data block corresponding to the first correlation coefficient and the second correlation coefficient are respectively treated as a first target audio data segment and a second target audio data segment, and corresponding audio data segments in the second audio data block are treated as a first auxiliary audio data segment and a second auxiliary audio data segment. In this way, a time difference between a target audio data segment and a corresponding auxiliary audio data segment, i.e., an audio segment time difference, can be further calculated separately. Furthermore, in a scenario where each sound sensing device corresponds to one user, a distance between a sound sensing device and a corresponding user can be considered to be smaller than distance(s) between the sound sensing device and other user(s). In this way, in the case of multiple peaks of correlation coefficients, a target audio data segment corresponding to a correlation coefficient associated with a smaller time difference tends to be originated from a corresponding sound source of the sound sensing device. Therefore, a smaller time difference can be used as the reference time difference from among multiple calculated time differences.

In an implementation, the crosstalk data detection system 100 may further implement: taking a larger one of the first time difference and the second time difference as a crosstalk time difference. Correspondingly, the processing module may determine that an audio data segment includes crosstalk data when an associated audio segment time difference matches the crosstalk time difference.

In implementations, the audio segment time difference matching the crosstalk time difference may include: the audio segment time difference being equal to the crosstalk time difference. Alternatively, a first specified threshold is set, and the audio segment time difference may be considered to match the crosstalk time difference when an absolute value of a difference between the audio segment time difference and the crosstalk time difference is less than the first specified threshold. Specifically, the first specified threshold may be set to 0.008, for example. If the audio segment time difference is 0.042, the crosstalk time difference is 0.040, and the absolute value of the difference between these two is 0.002 (which is less than the first specified threshold), a determination can be made that an associated audio data segment includes crosstalk data.

In implementations, by determining the crosstalk time difference, crosstalk data in the first audio data block is detected according to the crosstalk time difference. When the audio segment time difference matches the crosstalk time difference, the audio data segment is determined to be crosstalk data.

In an implementation, the system 100 may further include a labeling module. The labeling module is configured to label an audio data segment in the first audio data block corresponding to a correlation coefficient as valid data when the correlation coefficient is greater than a defined coefficient value. Correspondingly, the processing module uses a time difference as an audio segment time difference only when an associated audio data segment is labeled as valid data.

In implementations, noise data in an audio data block can be eliminated using correlation coefficients. Two sound sensing devices that are relatively close together will sense the sound of a same sound source to generate audio data streams. As a result, the audio data streams outputted by the two sound sensing devices are divided into audio data segments that are relatively related to each other. Correlation coefficients that are calculated and obtained have relatively large values. If an audio data segment in the first audio data block has a smaller correlation coefficient with a corresponding audio data segment in the second audio data block, similarities of these two audio data segments can be considered to have relatively small. These two audio data segments are considered to be not originated from the same sound source, or the audio data segments may be formed by the noise of the electronic device itself.

In implementations, by setting a defined coefficient value for the correlation coefficients, audio data segments with correlation coefficients that are greater than or equal to the defined coefficient value are separated from audio data segments with correlation coefficients that are less than the defined coefficient value. In this way, audio data segments with correlation coefficients that are less than the defined coefficient value can be treated as noise data without further calculation processing, which reduces computational compliance of the system.

In implementations, a method of setting the defined coefficient value may include: directly setting an empirical value through a program; or analyzing a distribution of the correlation coefficients corresponding to the audio data segments in the audio data block, and multiplying a mean value of the correlation coefficients by a coefficient that is less than one to obtain the defined coefficient value, for example, one-third, or one-quarter of the mean value of the correlation coefficients.

In an implementation, the number of peaks of the correlation coefficients obtained by the coefficient calculation module from calculating the correlation coefficients between the audio data segments of the first audio data block and the audio data segments of the second audio data block may be one. Correspondingly, when setting the time difference between the acquisition time of the audio data segment in the first audio data block and the acquisition time of the audio data segment in the second audio data block corresponding to the peak value as the reference time difference, the time difference determination module may set the time difference as the reference time difference when a signal strength of the first audio data block is higher than a signal strength of the second audio data block.

In implementations, the signal strength of the first audio data block being higher than the signal strength of the second audio data block may include calculating respective sound pressure values or energies of the first audio data block and the second audio data block. Alternatively, under the enlightenment of the technical essence of the present disclosure, one skilled in the art adopt other calculations that can reflect the characteristics of the signal strengths of the first audio data block and the second audio data block, which shall be covered in the scope of protection of the present application as long as the signal strength that is reflected is the same as or similar to the present disclosure. The signal strength of the first audio data block is compared with the second audio data block. If the signal strength of the first audio data block is greater than the signal strength of the second audio data block, the time difference that is obtained can be determined as the reference time difference.

In implementations, specifically, the perspective of calculating energy is used as an example. The energy of the first audio data block being greater than the energy of the corresponding second audio data block may include calculating the energies of audio data in the first audio data block, obtaining a first average value based on an average value of the calculated energies in the first audio data block; and calculating the energies of audio data in the second audio data block, and obtaining a second average value based on an average value of the calculated energies in the second audio data block. The first average value may be compared to the second average value. If the first average value is greater than the second average value, a determination is made that the energy of the first audio data block is greater than the energy of the corresponding second audio data block. Alternatively, a threshold may be set. When the first average value minus the second average value is greater than the set threshold, a determination may be made that the energy of the first audio data block is greater than the energy of the corresponding second audio data block. Under the enlightenment of the technical essence of the present disclosure, one skilled in the art adopt other methods that can determine that the energy of the first audio data block is greater than the energy of the corresponding second audio data block, which shall be covered by the scope of protection of the present application, as long as the energy of audio data in an audio data block that is determined is the same as or similar to the present disclosure.

In implementations, a distance between a sound sensing device and a corresponding sound source is generally smaller than distance(s) between the sound sensing device and other sound source(s). After being emitted from a sound source, a sound is attenuated with distance to a certain extent. In this way, an energy or sound pressure value represented by an audio data stream that is generated by the corresponding sound source and sensed by the sound sensing device is relatively large. In some cases, the signal strength in the first audio data block is weaker than that the signal strength in the second audio data block, which can be understood as the current sound source corresponding to the data channel where the second audio data block is located, or corresponding to the sound sensing device that generates the second audio data block. It can be concluded that, relative to the first data channel, the audio data included in the first audio data block may not be originated from the sound source corresponding to the first data channel, or at least some parts of the audio data segments in the first audio data block are not originated from the sound source corresponding to the first data channel. Through the above analysis, distinguishing whether an audio data segment in the first audio data block is originated from a sound source corresponding to the first data channel can be made through the signal strengths in the first audio data block and the second audio data block.

In an implementation, the correlation coefficients between the audio data segments in the first audio data block and the audio data segments in the second audio data block form the correlation coefficient set. The time difference determination module may also implement: counting a statistical number of correlation coefficients in the correlation coefficient set that are greater than a defined coefficient value; and correspondingly, setting the time difference as the reference time difference only when the signal strength in the first audio data block is greater than the signal strength in the second audio data block and the statistical number is greater than a defined number threshold.

In implementations, it is possible to distinguish whether an audio data segment in the first audio data block is valid data or noise data according to a correlation coefficient. Specifically, a correlation coefficient in the correlation coefficient set can be compared with a defined coefficient value. If the correlation coefficient is greater than the defined coefficient value, a determination can be made that an audio data segment corresponding to the correlation coefficient is valid data.

In implementations, the statistical number being greater than the defined number threshold can be understood as the number of pieces of valid data in the audio data block being greater than the defined number threshold. In some cases, if the statistical number is less than the defined number threshold, the valid data in the audio data block can be considered to be very small, and no further processing may be performed to reduce the amount of computations.

In an implementation, the time difference determination module 106 may further implement: determining the time difference as a crosstalk time difference when the signal strength of the first audio data block is weaker than the signal strength of the second audio data block. Correspondingly, the processing module determines that the audio data segment includes crosstalk data when the audio segment time difference matches the crosstalk time difference.

In implementations, the signal strength of the first audio data block being weaker than the signal strength of the second audio data block may include: the energy of the first audio data block being less than the corresponding second audio data block, or a sound pressure value of the first audio data block being less than a sound pressure value of the corresponding second audio data block.

In implementations, by setting a crosstalk time difference, detection can be directly performed on an audio data segment of the first audio data block. Therefore, a determination is made as to whether the audio data segment in the first audio data block is originated from a sound source that does not correspond to the first data channel.

Figure 4:
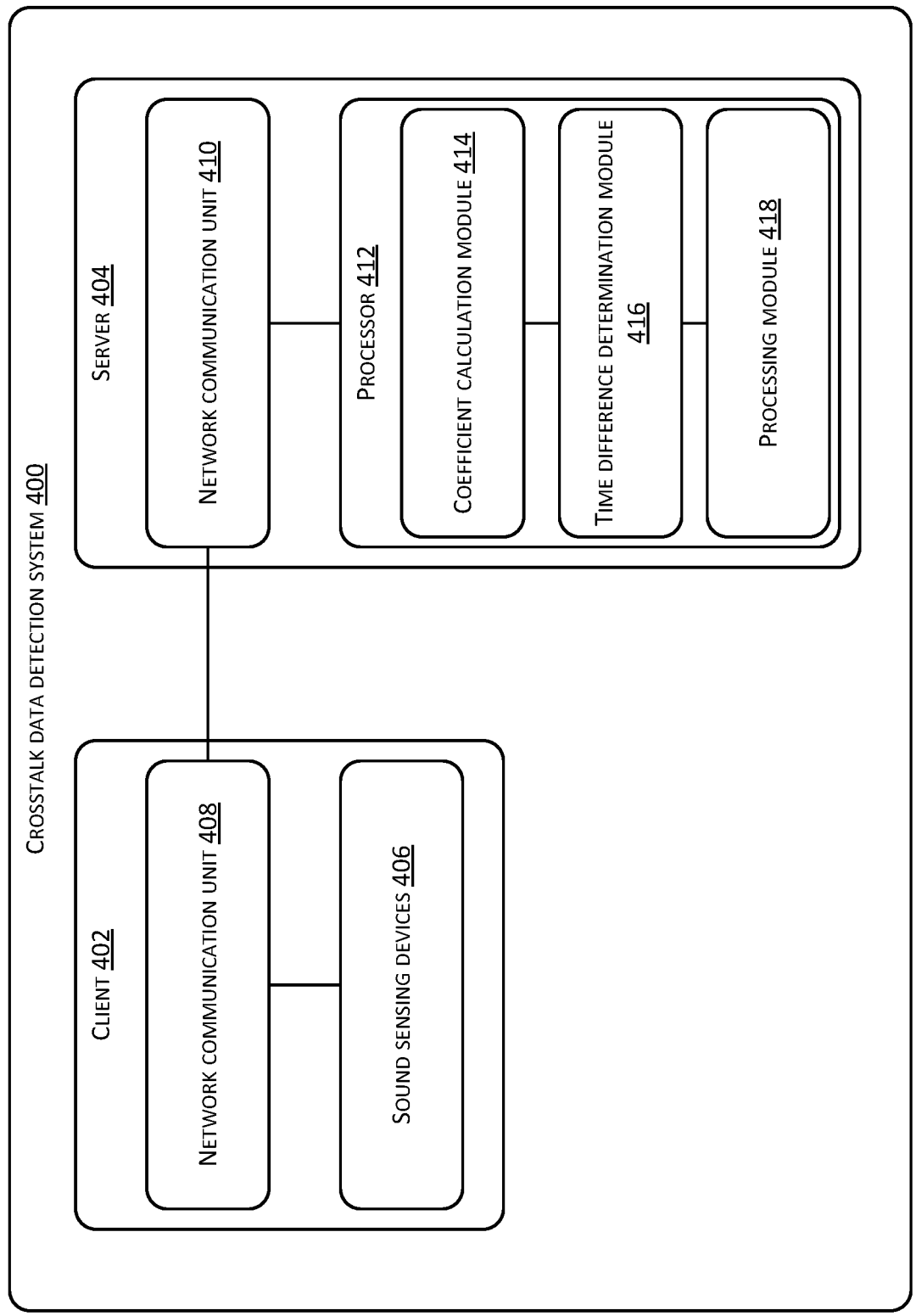
FIG. 4 is a schematic modular diagram of a crosstalk data detection system provided by the implementations of the present disclosure.

Referring to FIG. 4, the implementations of the present disclosure provide a crosstalk data detection system 400. The crosstalk data detection system 400 may include a client 402 and a server 404.

In implementations, the client 402 may include an electronic device with data receiving and sending capabilities. The client 402 may include at least two sound sensing devices 406 and a network communication unit 408. In implementations, the client 402 may also include memory, etc.

In implementations, the memory may include a form of computer readable media such as a volatile memory, a random access memory (RAM) and/or a non-volatile memory, for example, a read-only memory (ROM) or a flash RAM. The memory is an example of a computer readable media.

The computer readable media may include a volatile or non-volatile type, a removable or non-removable media, which may achieve storage of information using any method or technology. The information may include a computer readable instruction, a data structure, a program module or other data. Examples of computer readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, a sound sensing device 406 can be used to sense a sound emitted by a sound source and generate corresponding audio data. Specifically, the sound sensing device 406 may be a sound transmitter or a microphone provided with a sound transmitter. The sound transmitter is used to convert a sound into an electric signal to obtain an audio data stream. Each sound sensing device may correspond to a data channel, and the sound sensing device 406 may provide an audio data stream generated by the sound sensing device 406 to the network communication unit 408 through the data channel. Specifically, the at least two sound sensing devices 406 may include a first sound sensing device and a second sound sensing device. Correspondingly, the first sound sensing device may correspond to a first data channel, and the second sound sensing device may correspond to a second data channel.

In implementations, the network communication unit 408 includes a device for performing network data communications according to network communication protocol(s). The network communication unit 408 may receive audio data provided by the sound sensing devices 406, and may also send the audio data to the server 404. The network communication unit 408 may send the received audio data to the server through the data channels.

In implementations, the client 402 may have relatively weak data processing capabilities, and may be an electronic device such as an Internet of Things device. The client 402 may have a receiving module and a sending module. The network communication unit 408 of the client can implement functions of the sending module.

In implementations, the server 404 may include an electronic device with certain computing processing capabilities, which may have a network communication unit 410, a processor 412, etc. In implementations, the server 404 may also include memory, etc. Apparently, the server 404 may also refer to software running in the electronic device. The server 404 may also be a distributed server, which may be a system with multiple processors, network communication modules, etc., that operate in coordination. Alternatively, the server 404 may also be a server cluster formed by a number of servers. Apparently, the server 404 can also be implemented using cloud computing technology. In other words, functional modules operated by the server 404 are operated using cloud computing technology.

In implementations, the network communication unit 410 may be a device that performs network data communications according to network communication protocol(s), and may be configured to receive audio data streams provided by the client 402. The network communication unit 410 may serve as the receiving module.

In implementations, the server 404 may include a coefficient calculation module 414, a time difference determination module 416, and a processing module 418. In implementations, the server 404 may further include a receiving module. The network communication unit 410 can implement functions of the receiving module. Details of content of the functional modules of the server 404 can be referenced and compared to other implementations.

In implementations, the processor 412 can be implemented in any suitable manner. For example, the processor may take a form of a microprocessor or a processor, and a computer-readable medium storing computer-readable program codes (such as software or firmware) executable by the (micro)processor, logic gates, switches, special-purpose integrated circuit (Application Specific Integrated Circuit, ASIC), programmable logic controllers, embedded microcontrollers, etc.

Figure 5:
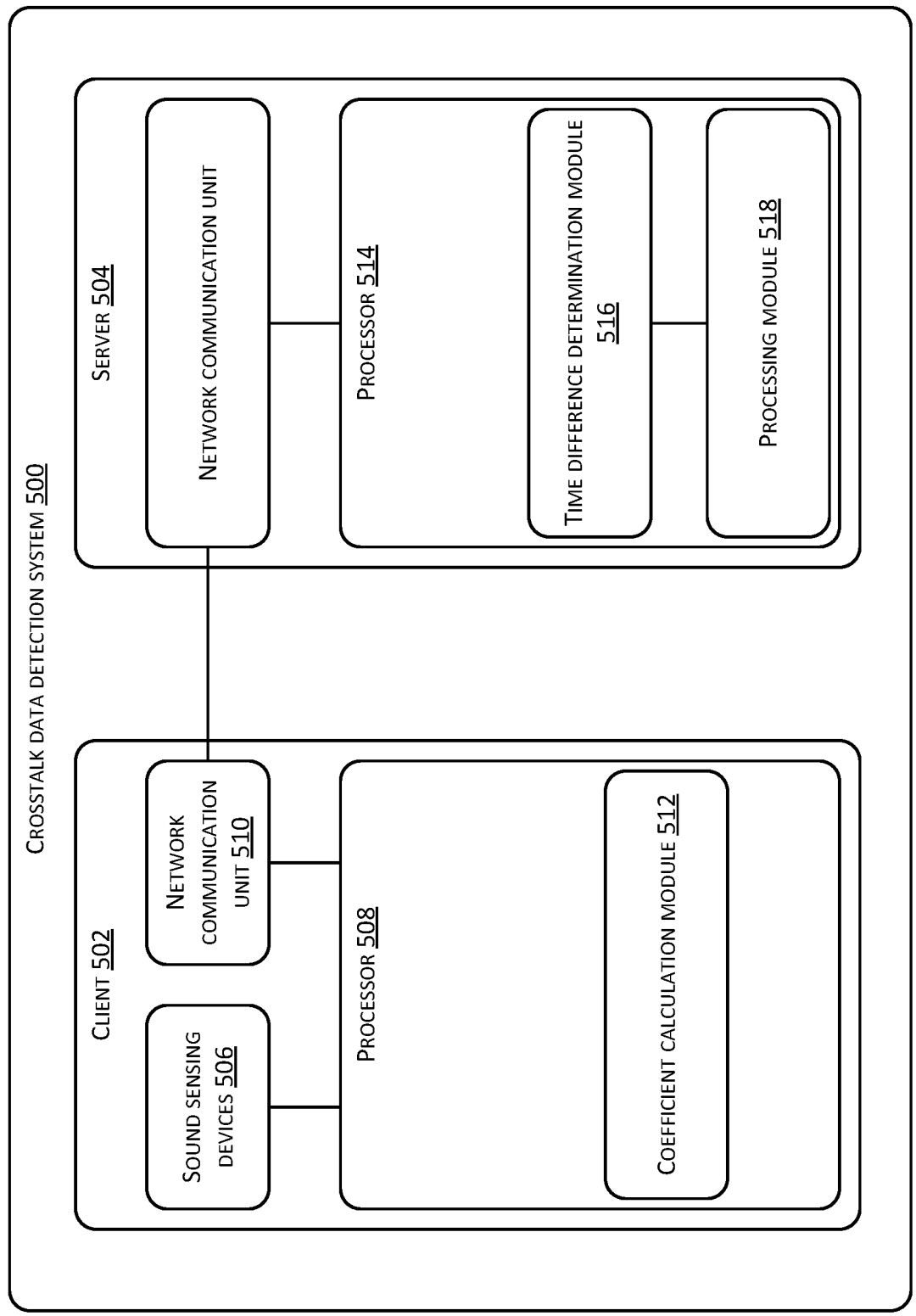
FIG. 5 is a schematic modular diagram of a crosstalk data detection system provided by the implementations of the present disclosure.

Referring to FIG. 5, the implementations of the present disclosure also provide a crosstalk data detection system 500. The crosstalk detection system 500 may include a client 502 and a server 504.

In implementations, the client 502 may include at least two sound sensing devices 506, a processor 508, and a network communication unit 510. For details of the functions of the at least two sound sensing devices 506 described in implementations, reference may be made to other implementations, which are not repeated herein. The client 502 may be a device with certain processing capabilities. Specifically, for example, the client 502 may be a notebook computer, or a smart terminal device. The network communication unit 510 may implement a receiving module, and a coefficient calculation module 512 may be located in the processor 508. The network communication unit 510 may be a device that performs network data communications according to network communication protocol(s).

In implementations, a processor 514 of the server 504 may run a time difference determination module 516 and a processing module 518 that are described above. Details of implementations can be referenced and compared to other implementations.

Figure 6:
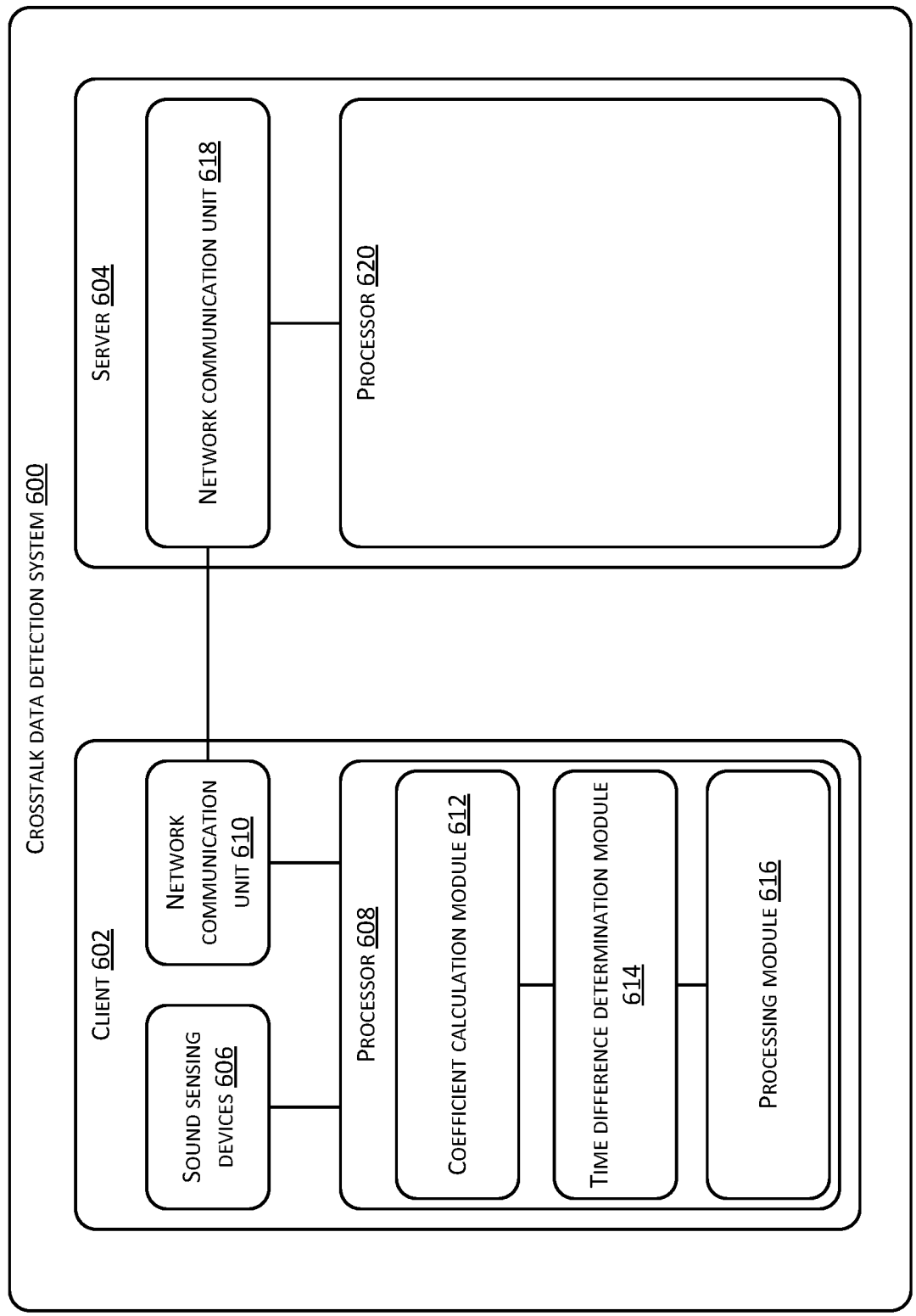
FIG. 6 is a schematic modular diagram of a crosstalk data detection system provided by the implementations of the present disclosure.

Apparently, referring to FIG. 6, in implementations, the coefficient calculation module and the time difference determination module may also be run in the client, and a reference time difference, a first audio data block and a second audio data block are sent to the server. The server may only run the processing module.

As shown in FIG. 6, the implementations of the present disclosure also provide a crosstalk data detection system 600. The crosstalk detection system 600 may include a client 602 and a server 604.

In implementations, the client 602 may include at least two sound sensing devices 606 and a processor 608. In implementations, the client 602 may also include a network communication unit 610. For details of the functions implemented by the at least two sound sensing devices 606 described in implementations, reference may be made to other implementations, which are not repeated herein. The client 602 can have strong processing capabilities. The processor 608 may run a coefficient calculation module 612, a time difference determination module 614, and a processing module 616. In this scenario, there is no need to interact with the server 604. Alternatively, an audio data block processed by the processing module 616 may be provided to the server 604 which includes a network communication unit 618 and a processor 620. Specifically, for example, the client 602 may be a tablet computer, a notebook computer, a desktop computer, a workstation, etc. with relatively high performance.

Apparently, the above corresponds to examples of some electronic devices only. With the progress of science and technology, the performance of hardware devices may be improved, so that electronic devices with relatively weak data processing capabilities may also have better data processing capabilities. Therefore, in the foregoing implementations, a division of software modules running on hardware devices does not constitute any limitations on the present application. One skilled in the art may further divide the functions of the above-mentioned software modules, and place them in a client or a server to run accordingly. However, the implemented functions and effects shall be covered by the scope of protection of the present application as long as they are the same as or similar to the present disclosure.

The implementations of the present disclosure also provide a computer storage medium. The computer storage medium stores a computer program, and the computer program, when executed, implements: receiving a first audio data block and a second audio data block, wherein the first audio data block and the second audio data block include multiple audio data segments respectively; determining a target audio data segment in the first audio data block and an auxiliary audio data segment in the second audio data block based on correlation coefficients between the first audio data block and the second audio data block, wherein at least a part of data in the target audio data segment and a part of data in the auxiliary audio data segment are originated from a same sound source, and the correlation coefficients are used to indicate degrees of similarity between audio data segments; determining a reference time difference for the first audio data block and the second audio data block according to the target audio data segment and the auxiliary audio data segment; calculating audio segment time differences between audio data segments of the first audio data block and corresponding audio data segments in the second audio data block; and determining that a corresponding audio data segment of the first audio data block includes crosstalk data when an associated audio segment time difference does not match the reference time difference.

In implementations, the computer storage medium includes, but is not limited to, random access memory (RAM), read-only memory (ROM), cache, and hard disk (HDD), or memory card.

In implementations, details of the functions implemented by the computer storage medium can be described with reference to other implementations.

The implementations of the present disclosure also provide a computer storage medium. The computer storage medium stores a computer program, and the computer program, when executed, implements: receiving a first audio data block and a second audio data block, wherein, the first audio data block and the second audio data block include multiple audio data segments respectively; determining a target audio data segment in the first audio data block and an auxiliary audio data segment in the second audio data block based on correlation coefficients between the first audio data block and the second audio data block, wherein at least a part of data in the target audio data segment and a part of data in the auxiliary audio data segment are originated from a same sound source; determining a reference time difference between the first audio data block and the second audio data block based on the target audio data segment and the auxiliary audio data segment; sending the reference time difference, the first audio data block, and the second audio data block to a server, to enable the server to calculate audio segment time differences between audio data segments of the first audio data block and corresponding audio data segments in the second audio data block, and determine that a corresponding audio data segment of the first audio data block includes crosstalk data when an associated audio segment time difference does not match the reference time difference.

In implementations, details of the functions implemented by the computer storage medium can be described with reference to other implementations.

The implementations of the present disclosure also provide a computer storage medium. The computer storage medium stores a computer program, and the computer program, when executed, implements: receiving a first audio data block, a second audio data block, and a reference time difference, the first audio data block and the second audio data block respectively include a plurality of audio data segments; calculating audio segment time differences between audio data segments of the first audio data block and corresponding audio data segments in the second audio data block; and determining that a corresponding audio data segment of the first audio data block includes crosstalk data when an associated audio segment time difference does not match the reference time difference.

In implementations, details of the functions implemented by the computer storage medium can be described with reference to other implementations.

The implementations of the present disclosure also provide a computer storage medium. The computer storage medium stores a computer program, and the computer program, when executed, implements: receiving a first audio data block and a second audio data block, wherein the first audio data block and the second audio data block respectively include multiple audio data segments; determining a target audio data segment in the first audio data block and an auxiliary audio data segment in the second audio data block based on correlation coefficients between the first audio data block and the second audio data block, wherein at least a part of data in the target audio data segment and a part of data in the auxiliary audio data segment are originated from a same sound source; sending the target audio data segment, the auxiliary audio data segment, the first audio data block, and the second audio data block to a server, to enable the server to determine a reference time difference between the first audio data block and the second audio data block based on the target audio data segment and the auxiliary audio data segment; and calculating audio segment time differences between audio data segments of the first audio data block and corresponding audio data segments of the second audio data block, and determining that a corresponding audio data segment of the first audio data block includes crosstalk data when an associated audio segment time difference does not match the reference time difference.

In implementations, details of the functions implemented by the computer storage medium can be described with reference to other implementations.

The implementations of the present disclosure also provide a computer storage medium. The computer storage medium stores a computer program, and the computer program, when executed, implements: receiving a target audio data segment, an auxiliary audio data segment, a first audio data block, and a second audio data block, wherein the first audio data block and the second audio data block each include a plurality of audio data blocks, the target audio data segment is selected from the first audio data block, and the auxiliary audio data segment is selected from the second audio data block; determining a reference time difference between the first audio data block and the second audio data block based on the target audio data segment and the auxiliary audio data segment; calculating audio segment time differences between audio data segments in the first audio data block and corresponding audio data segments in the second audio data block; and determining that a corresponding audio data segment of the first audio data block includes crosstalk data when an associated audio segment time difference does not match the reference time difference.

In implementations, details of the functions implemented by the computer storage medium can be described with reference to other implementations.

The implementations of the present disclosure also provide a computer storage medium. The computer storage medium stores a computer program, and the computer program, when executed, implements: receiving a first audio data block and a second audio data block wherein the first audio data block and the second audio data block respectively include multiple audio data segments; sending the first audio data block and the second audio data block to a server, to enable the server to determine a target audio data segment in the first audio data block and an auxiliary audio data segment in the second audio data block based on correlation coefficients between the first audio data block and the second audio data block, wherein at least a part of data in the target audio data segment and a part of data in the auxiliary audio data segment are originated from a same sound source; determining a reference time difference between the first audio data block and the second audio data block based on the target audio data segment and the auxiliary audio data segment; and calculating audio segment time differences between audio data segments in the first audio data block and the corresponding audio data segments in the second audio data block, and determining that a corresponding audio data segment of the first audio data block includes crosstalk data in the audio when an associated segment time difference does not match the reference time difference.

In implementations, details of the functions implemented by the computer storage medium can be described with reference to other implementations.

The above description of various implementations of the present disclosure is provided to one skilled in the art for the purpose of description. It is not intended to be exhaustive, or to limit the invention to disclosed implementations. As described above, various replacements and changes in the present disclosure are obvious to one skilled in the art to which the above-mentioned technologies belong. Therefore, although some implementations have been discussed in detail, other implementations are obvious, or relatively easy to be obtained by one skilled in the art. The present disclosure is intended to include all alternatives, modifications, and changes of the present disclosure that are discussed herein, as well as other implementations falling within the spirit and scope of the application.

Expressions "first" and "second" in the various implementations of the specification are only used to distinguish different data channels and audio data blocks, and the numbers of data channels and audio data blocks are not limited herein. Multiple (but not limited to two) data channels and audio data blocks may be included.

From the description of the foregoing implementations, one skilled in the art can clearly understand that the present application can be implemented by means of software plus a necessary general hardware platform. Based on such understanding, the essence of the technical solutions of the present application or the parts that contribute to the existing technologies can be embodied in a form of a software product. Such computer software product can be stored in a storage medium, such as ROM/RAM, a magnetic disk, an optical disk, etc., and includes a number of instructions to cause a computing device (which can be a personal computer, a server, or a network device, etc.) to execute the methods described in each embodiment of the present application or some parts of the implementations.

The various implementations in the present disclosure are described in a progressive manner, and the same or similar parts between the various implementations can be referenced to each other. Each implementation focuses on aspects that are different from those of other implementations.

The present disclosure can be used in a number of general or special computer system environments or configurations, for example, personal computers, server computers, handheld devices or portable devices, tablet devices, microprocessor-based systems, set-top boxes, programmable consumer electronic devices, network PCs, small computers, and distributed systems including any of the above computing environments, etc.

Although the present disclosure has been described using implementations, one of ordinary skill in the art know that a number of variations and changes exist in the present disclosure without departing from the spirit of the present disclosure. It is intended that the appended claims include these variations and changes without departing from the spirit of the present disclosure.

The present disclosure can further be understood using the following clauses.

Clause 1: A method for detecting crosstalk data, comprising: receiving a first audio data block and a second audio data block, wherein the first audio data block and the second audio data block each include a plurality of audio data segments; calculating correlation coefficients between audio data segments of the first audio data block and audio data segments of the second audio data block to obtain a peak value of the correlation coefficients; setting a time difference between an acquisition time of an audio data segment in the first audio data block and an acquisition time of an audio data segment in the second audio data block corresponding to the peak value as a reference time difference; setting time differences between acquisition times of the audio data segments of the first audio data block and the corresponding audio data segments of the second audio data block as audio segment time differences; and determining that a corresponding audio data segment of the first audio data block includes crosstalk data when an associated audio segment time difference does not match the reference time difference.

Clause 2: The method of Clause 1, wherein calculating the correlation coefficients between the audio data segments of the first audio data block and the audio data segments of the second audio data block to obtain the peak value of the correlation coefficients comprises: forming a correlation coefficient set by calculating the correlation coefficients between the audio data segments of the first audio data block and the audio data segments of the second audio data block; and using a maximum value in the correlation coefficient set as the peak value.

Clause 3: The method of Clause 1, wherein: a number of peak values is two in the step of calculating the correlation coefficients between the audio data segments of the first audio data block and the audio data segments of the second audio data block to obtain the peak value of the correlation coefficients; and correspondingly, setting the time difference between the acquisition time of the audio data segment in the first audio data block and the acquisition time of the audio data segment in the second audio data block corresponding to the peak value as the reference time difference comprises: separately calculating time differences between acquisition times of audio data segments of the first audio data block and acquisition times of audio data segments of the second audio data block corresponding to the two peak values, which are a first time difference and a second time difference respectively, wherein a smaller one of the first time difference and the second time difference is set as the reference time difference.

Clause 4: The method of Clause 3, further comprising: setting a larger one of the first time difference and the second time difference as a crosstalk time difference; and determining that the audio data segment includes crosstalk data when the audio segment time difference matches the crosstalk time difference.

Clause 5: The method of Clause 4, wherein the audio segment time difference matching the crosstalk time difference comprises: the audio segment time difference being equal to the crosstalk time difference; or a difference between the audio segment time difference and the crosstalk time difference being less than a first specified threshold.

Clause 6: The method of Clause 1, wherein the audio segment time difference not matching the reference time difference comprises: the audio segment time difference being not equal to the reference time difference; or a difference between the audio segment time difference and the reference time difference being greater than a second specified threshold.

Clause 7: The method of Clause 1, further comprising: labeling an associated audio data segment of the first audio data block corresponding to a correlation coefficient as valid data when the correlation coefficient is greater than a defined coefficient value, wherein: correspondingly, when setting the time differences between the acquisition times of the audio data segments of the first audio data block and the acquisition times of the corresponding audio data segments in the second audio data block as the audio segment time differences, the time differences is regarded as the audio segment time differences only when the audio data segments are marked as valid data.

Clause 8: The method of Clause 1, wherein: a number of peak values is one in the step of calculating the correlation coefficients between the audio data segments of the first audio data block and the audio data segments of the second audio data block to obtain the peak value of the correlation coefficients; and setting the time difference between the acquisition time of the audio data segment in the first audio data block and the acquisition time of the audio data segment in the second audio data block corresponding to the peak value as the reference time difference comprises: determining the time difference as the reference time difference when a signal strength of the first audio data block is higher than a signal strength of the second audio data block.

Clause 9: The method of Clause 8, wherein the correlation coefficients calculated between the audio data segments of the first audio data block and the audio data segments of the second audio data block form a correlation coefficient set, and the method further comprises: counting a statistical number of the correlation coefficients in the correlation coefficient set that are greater than a defined coefficient value, wherein correspondingly, determining the time difference as the reference time difference when the signal strength of the first audio data block is higher than the signal strength of the second audio data block comprises: determining the time difference as the reference time difference only when the signal strength of the data block is higher than the signal strength of the second audio data block and the statistical number is greater than a set threshold.

Clause 10: The method of Clause 8, wherein the signal strength of the first audio data block being higher than the signal strength of the second audio data block comprises: an energy of the first audio data block being larger than an energy of the second audio data block; or a sound pressure value of the first audio data block being larger than a sound pressure value of the second audio data block.

Clause 11: The method of Clause 8, further comprising: determining the time difference as a crosstalk time difference when the signal strength of the first audio data block is weaker than the signal strength of the second audio data block; and determining that the audio data segment includes crosstalk data when the audio segment time difference matches the crosstalk time difference.

Clause 12: The method of Clause 11, wherein the signal strength of the first audio data block being weaker than the signal strength of the second audio data block comprises: an energy of audio data in the first audio data block being less than an energy of audio data in the second audio data block; or a sound pressure value of the audio data in the first audio data block being less than a sound pressure value of the audio data in the second audio data block.

Clause 13: An electronic device, comprising: a first sound sensing device configured to generate a first audio data block, the first audio data block including a plurality of audio data segments; a second sound sensing device configured to generate a second audio data block, the second audio data block includes a plurality of audio data segments; and a processor configured to calculate correlation coefficients between the plurality of audio data segments of the first audio data block and the plurality of audio data segments of the second audio data block to obtain a peak value of the correlation coefficients, use a time difference between an acquisition time of an audio data segment in the first audio data block and an acquisition time of an audio data segment in the second audio data block corresponding to the peak value as a reference time difference, use time differences between acquisition times of audio data segments of the first audio data block and acquisition times of corresponding audio data segments of the second audio data block as audio segment time differences, and determine that a corresponding audio data segment of the first audio data block includes crosstalk data when an associated audio segment time difference does not match the reference time difference.

Clause 14: A method for detecting crosstalk data, comprising: receiving a first audio data block and a second audio data block, wherein the first audio data block and the second audio data block each include a plurality of audio data segments; calculating correlation coefficients between audio data segments of the first audio data block and audio data segments of the second audio data block to obtain a peak value of the correlation coefficients; using a time difference between an acquisition time of an audio data segment in the first audio data block and an acquisition time of an audio data segment in the second audio data block corresponding to the peak value as a reference time difference; sending the reference time difference, the first audio data block, and the second audio data block to a server, to allow the server to use time differences between acquisition times of audio data segments of the first audio data block and acquisition times of corresponding audio data segments of the second audio data block as audio segment time differences, and to determine that a corresponding audio data segment of the first audio data block includes crosstalk data when an associated audio segment time difference does not match the reference time difference.

Clause 15: A method for detecting crosstalk data, comprising: receiving a first audio data block, a second audio data block, and a reference time difference, wherein the first audio data block and the second audio data block separately include a plurality of audio data segments; using a time difference between an acquisition time of an audio data segment in the first audio data block and a corresponding audio data segment in the second audio data block as an audio segment time difference; and determining that the audio data segment of the first audio data block includes crosstalk data when the audio segment time difference does not match the reference time difference.

Clause 16: A method for detecting crosstalk data, comprising: receiving a first audio data block and a second audio data block, wherein the first audio data block and the second audio data block separately include a plurality of audio data segments; calculating correlation coefficients between audio data segments of the first audio data block and audio data segments of the second audio data block to obtain a peak value of the correlation coefficients; and sending the peak value, the first audio data block, and the second audio data block to a server, to allow the server to set a time difference between an acquisition time of an audio data segment in the first audio data block and an audio data segment in the second audio data block corresponding to the peak value as a reference time difference, to set time differences between acquisition times of audio data segments in the first audio data block and acquisition times of corresponding audio data segments in the second audio data block as audio segment time differences, and to determine that a corresponding audio data segment of the first audio data block includes crosstalk data when an associated audio segment time difference does not match the reference time difference.

Clause 17: A method for detecting crosstalk data, comprising: receiving a peak value of correlation coefficients, a first audio data block, and a second audio data block provided by a client, wherein the peak value is a peak value of correlation coefficients between audio data segments of the first audio data block and audio data segments of the second audio data block; setting a time difference between an acquisition time of an audio data segment in the first audio data block and an acquisition time of an audio data segment in the second audio data block corresponding to the peak value as a reference time difference; setting time differences between acquisition times of audio data segments in the first audio data block and acquisition times of corresponding audio data segments in the second audio data block as audio segment time differences; and determining that a corresponding audio data segment of the first audio data block includes crosstalk data when an associated audio segment time difference does not match the reference time difference.

Clause 18: A method for detecting crosstalk data, comprising: receiving a first audio data block and a second audio data block, wherein the first audio data block and the second audio data block each include a plurality of audio data segments; sending the first audio data block and the second audio data block to a server, to allow the server to calculate correlation coefficients between audio data segments of the first audio data block and audio data segments of the second audio data block to obtain a peak value of the correlation coefficients; setting a time difference between an acquisition time of an audio data segment in the first audio data block and an acquisition time of an audio data segment in the second audio data block corresponding to the peak value as a reference time difference; setting time differences between acquisition times of audio data segments in the first audio data block and corresponding audio data segments in the second audio data block as acquisition times of audio segment time differences; and determining that a corresponding audio data segment of the first audio data block includes crosstalk data when an associated audio segment time difference does not match the reference time difference.

What is claimed is:

1. A method implemented by a computing device, the method comprising:

receiving a first audio data block and a second audio data block, wherein the first audio data block and the second audio data block each include a plurality of audio data segments;

calculating correlation coefficients between audio data segments of the first audio data block and corresponding audio data segments of the second audio data block to obtain a peak value of the correlation coefficients;

setting a time difference between an acquisition time of an audio data segment in the first audio data block and an acquisition time of an audio data segment in the second audio data block corresponding to the peak value as a reference time difference when a signal strength of the first audio data block is higher than a signal strength of the second audio data block, or setting the time difference as a crosstalk time difference when the signal strength of the first audio data block is weaker than the signal strength of the second audio data block;

setting time differences between acquisition times of the audio data segments of the first audio data block and the corresponding audio data segments of the second audio data block as audio segment time differences;

determining that a corresponding audio data segment of the first audio data block includes crosstalk data in response to an associated audio segment time difference matching the crosstalk time difference when the signal strength of the first audio data block is weaker than the signal strength of the second audio data block, or in response to the associated audio segment time difference not matching the reference time difference when the signal strength of the first audio data block is higher than the signal strength of the second audio data block; and removing the corresponding audio data segment including the crosstalk data from the first audio data block.

2. The method of claim 1, wherein calculating the correlation coefficients between the audio data segments of the first audio data block and the corresponding audio data segments of the second audio data block to obtain the peak value of the correlation coefficients comprises:

forming a correlation coefficient set by calculating the correlation coefficients between the audio data segments of the first audio data block and the audio data segments of the second audio data block; and using a maximum value in the correlation coefficient set as the peak value.

3. The method of claim 1, wherein:

the peak value comprises a plurality of peak values; and setting the time difference between the acquisition time of the audio data segment in the first audio data block and the acquisition time of the audio data segment in the second audio data block corresponding to the peak value as the reference time difference comprises:

separately calculating a first time difference and a second time difference between acquisition times of audio data segments of the first audio data block and acquisition times of audio data segments of the second audio data block corresponding to a first peak value and a second peak value of the plurality of peak values respectively, wherein a smaller one of the first time difference and the second time difference is set as the reference time difference.

4. The method of claim 3, further comprising:

setting a larger one of the first time difference and the second time difference as the crosstalk time difference.

5. The method of claim 1, wherein the audio segment time difference matching the crosstalk time difference comprises:

the audio segment time difference being equal to the crosstalk time difference; or a difference between the audio segment time difference and the crosstalk time difference being less than a first specified threshold.

6. The method of claim 1, wherein the audio segment time difference not matching the reference time difference comprises:

the audio segment time difference being not equal to the reference time difference; or a difference between the audio segment time difference and the reference time difference being greater than a second specified threshold.

7. The method of claim 1, further comprising:

labeling an associated audio data segment of the first audio data block corresponding to a correlation coefficient as valid data when the correlation coefficient is greater than a defined coefficient value.

8. The method of claim 1, wherein the correlation coefficients calculated between the audio data segments of the first audio data block and the corresponding audio data segments of the second audio data block form a correlation coefficient set, and the method further comprises:

counting a statistical number of the correlation coefficients in the correlation coefficient set that are greater than a defined coefficient value, wherein correspondingly, determining the time difference as the reference time difference when the signal strength of the first audio data block is higher than the signal strength of the second audio data block comprises: determining the time difference as the reference time difference when the signal strength of the first audio data block is higher than the signal strength of the second audio data block and the statistical number is greater than a set threshold.

9. The method of claim 1, wherein the signal strength of the first audio data block being higher than the signal strength of the second audio data block comprises:

an energy of the first audio data block being larger than an energy of the second audio data block; or a sound pressure value of the first audio data block being larger than a sound pressure value of the second audio data block.

10. The method of claim 1, wherein the signal strength of the first audio data block being weaker than the signal strength of the second audio data block comprises:

an energy of audio data in the first audio data block being less than an energy of audio data in the second audio data block; or a sound pressure value of the audio data in the first audio data block being less than a sound pressure value of the audio data in the second audio data block.

11. One or more computer readable media storing executable instructions that, when executed by one or more processors, cause the one or more processors to perform acts comprising:

receiving a first audio data block and a second audio data block, wherein the first audio data block and the second audio data block separately include a plurality of audio data segments;

calculating correlation coefficients between audio data segments of the first audio data block and corresponding audio data segments of the second audio data block to obtain a plurality of peak values of the correlation coefficients;

setting time differences between acquisition times of the audio data segments of the first audio data block and acquisition times of the corresponding audio data segments of the second audio data block as audio segment time differences;

setting a first time difference and a second time difference of the audio segment time differences corresponding to a first peak value and a second peak value as a reference time difference and a crosstalk time difference respectively, the crosstalk time difference being larger than the reference time difference;

determining that a corresponding audio data segment of the first audio data block includes crosstalk data when an associated audio segment time difference matches the crosstalk time difference and does not match the reference time difference; and removing the corresponding audio data segment including the crosstalk data from the first audio data block.

12. The one or more computer readable media of claim 11, wherein calculating the correlation coefficients between the audio data segments of the first audio data block and the corresponding audio data segments of the second audio data block to obtain the plurality of peak values of the correlation coefficients comprises:

forming a correlation coefficient set by calculating the correlation coefficients between the audio data segments of the first audio data block and the corresponding audio data segments of the second audio data block; and using a maximum value in the correlation coefficient set as one of the plurality of peak values.

13. The one or more computer readable media of claim 11, wherein the audio segment time difference matching the crosstalk time difference comprises:

the audio segment time difference being equal to the crosstalk time difference; or a difference between the audio segment time difference and the crosstalk time difference being less than a first specified threshold.

14. The one or more computer readable media of claim 11, wherein the audio segment time difference not matching the reference time difference comprises:

the audio segment time difference being not equal to the reference time difference; or a difference between the audio segment time difference and the reference time difference being greater than a second specified threshold.

15. The one or more computer readable media of claim 11, the acts further comprising:

labeling an associated audio data segment of the first audio data block corresponding to a correlation coefficient as valid data when the correlation coefficient is greater than a defined coefficient value.

16. An electronic device, comprising:
a first sound sensing device configured to generate a first audio data block, the first audio data block including a plurality of audio data segments;
a second sound sensing device configured to generate a second audio data block, the second audio data block includes a plurality of audio data segments; and
a processor configured to:
calculate correlation coefficients between the plurality of audio data segments of the first audio data block and the plurality of audio data segments of the second audio data block to obtain a plurality of peak values of the correlation coefficients,
set time differences between acquisition times of the audio data segments of the first audio data block and acquisition times of the corresponding audio data segments of the second audio data block as audio segment time differences,
set a first time difference and a second time difference of the audio segment time differences corresponding to a first peak value and a second peak value as a reference time difference and a crosstalk time difference respectively, the crosstalk time difference being larger than the reference time difference,
determine that a corresponding audio data segment of the first audio data block includes crosstalk data when an associated audio segment time difference matches the crosstalk time difference and does not match the reference time difference, and
remove the corresponding audio data segment including the crosstalk data from the first audio data block.

17. The electronic device of claim 16, wherein the audio segment time difference matching the crosstalk time difference comprises:
the audio segment time difference being equal to the crosstalk time difference; or
a difference between the audio segment time difference and the crosstalk time difference being less than a first specified threshold.

18. The electronic device of claim 16, wherein the audio segment time difference not matching the reference time difference comprises:
the audio segment time difference being not equal to the reference time difference; or
a difference between the audio segment time difference and the reference time difference being greater than a second specified threshold.

19. The electronic device of claim 16, wherein the processor is further configured to:
label an associated audio data segment of the first audio data block corresponding to a correlation coefficient as valid data when the correlation coefficient is greater than a defined coefficient value.

20. The electronic device of claim 16, wherein calculating the correlation coefficients between the audio data segments of the first audio data block and the corresponding audio data segments of the second audio data block to obtain the plurality of peak values of the correlation coefficients comprises:
forming a correlation coefficient set by calculating the correlation coefficients between the audio data segments of the first audio data block and the corresponding audio data segments of the second audio data block; and
using a maximum value in the correlation coefficient set as one of the plurality of peak values.

* * * * *